March 8, 1932.  U. A. MICHELI  1,848,642
BUTTER SLICING AND DISPENSING MACHINE
Filed Dec. 26, 1929    3 Sheets-Sheet 1

Inventor
Ussi A. Micheli
by Hazard and Miller
Attorneys

March 8, 1932.  U. A. MICHELI  1,848,642
BUTTER SLICING AND DISPENSING MACHINE
Filed Dec. 26, 1929  3 Sheets-Sheet 2
Fig. 2.
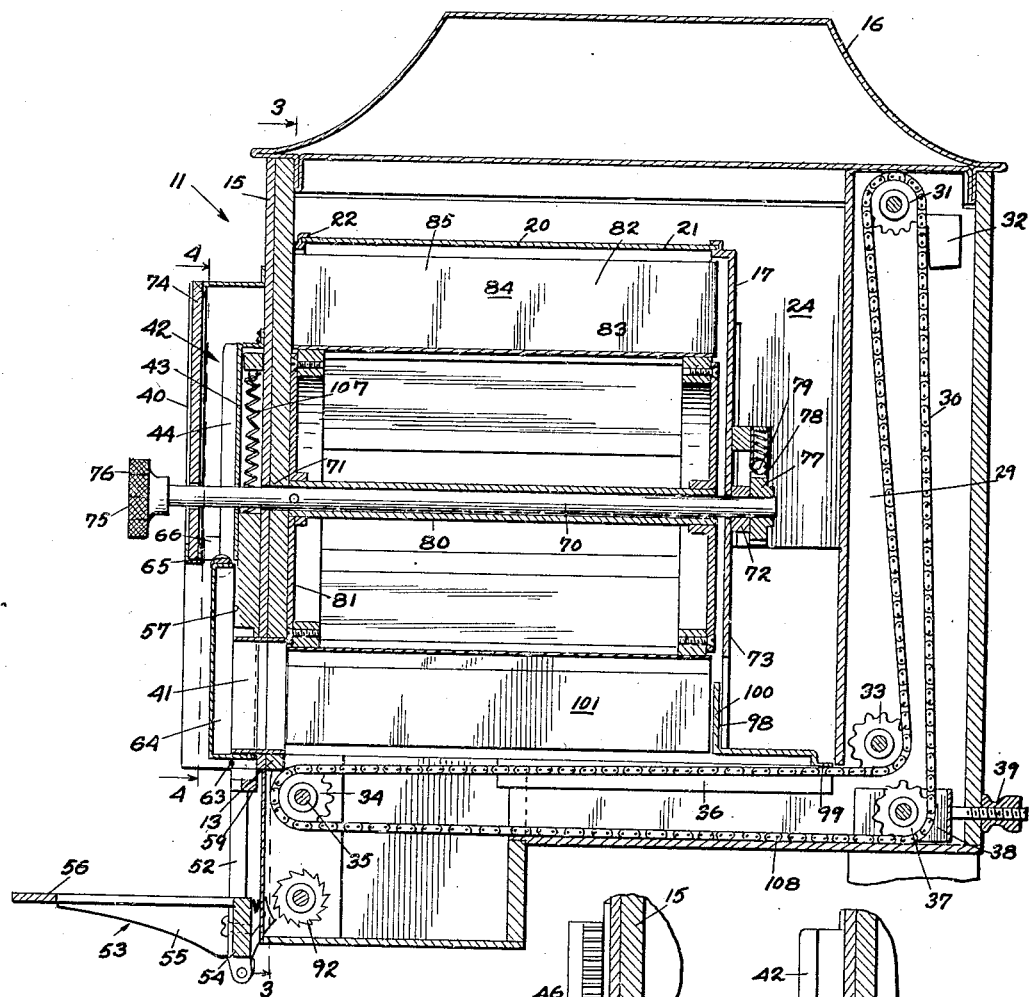
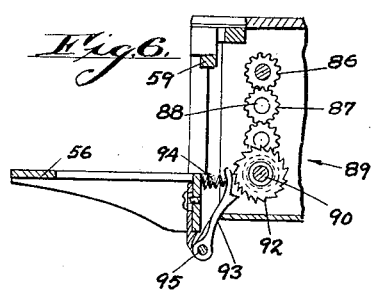
Fig. 6.
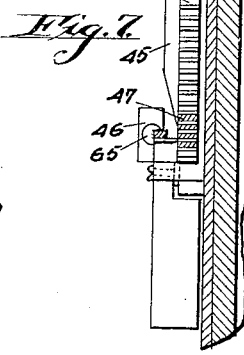
Fig. 7.
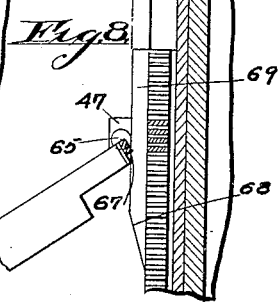
Fig. 8.
Inventor
Ulissi A. Micheli
by Hazard and Miller
Attorneys

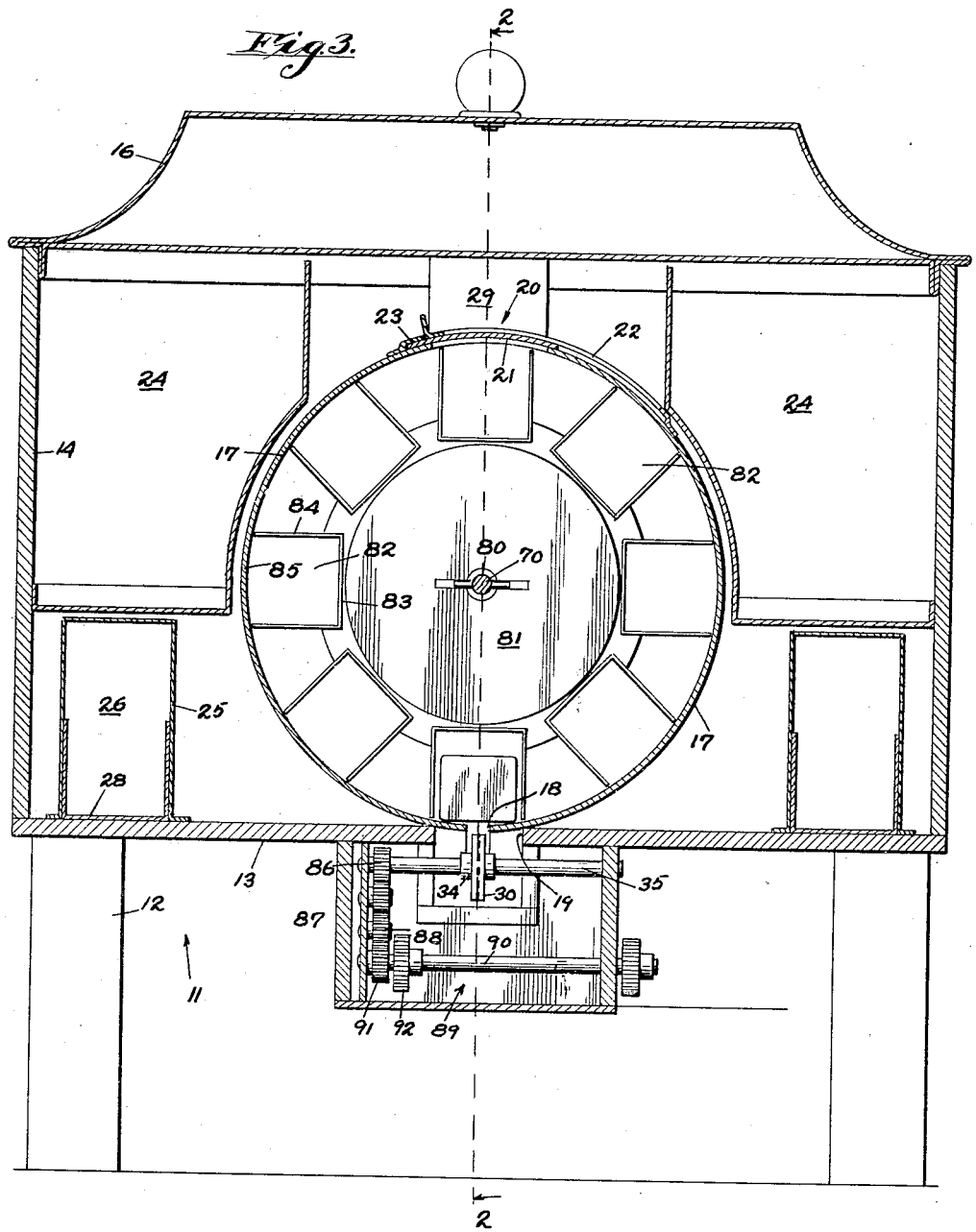

Patented Mar. 8, 1932

1,848,642

UNITED STATES PATENT OFFICE

ULISSI A. MICHELI, OF LOS ANGELES, CALIFORNIA, ASSIGNOR OF ONE-FOURTH TO THOMAS WESTFALL, OF LOS ANGELES, CALIFORNIA, THIRTY PER CENT TO LEO MICHELI, OF LAS VEGAS, NEVADA, AND TEN PER CENT TO PETER VUJOVICH, OF SAN DIEGO, CALIFORNIA

BUTTER SLICING AND DISPENSING MACHINE

Application filed December 26, 1929. Serial No. 416,404.

My invention pertains to a butter slicing and dispensing machine particularly adapted for restaurant and cafeteria use.

An object of my invention is a machine which will slice and dispense butter in small individual slices for a customer in a restaurant or cafeteria and in which a block of butter may be fed in a forward direction and the slices removed therefrom, the sliced pats of butter being dispensed by the machine and deposited on a butter chip or plate.

A general object of my invention is to serve butter in a cleaner and more sanitary manner than is now the custom, in which a large quantity of butter is sliced and either stacked in slices or placed on plates and then served to the customers.

A main object of my invention is a machine in which the butter blocks may be kept in good condition by having ice or refrigeration chambers in the machine and in which the butter is kept in a cold condition prior to the slicing and serving and is sliced while in the cold condition, the machine slicing an individual pat of butter at a time.

Another general object and feature of my invention is a dispensing machine having storage compartments for blocks of butter and movable compartments for the butter to be dispensed, both sets of compartments being refrigerated either by ice or by other refrigerating means, and also in which the movable compartments are shifted so that each block of butter may be brought to a position for cutting and dispensing the butter pats.

In this connection a more detailed object of my invention is having a plurality of compartments for the butter to be dispensed mounted inside of a drum and rotatable therein. The drum has an opening at the top through which the individual compartments may be loaded with a block of butter and each compartment has an open side adjacent the drum for loading the compartment and when the drum is rotated the compartments with their charge of butter are successively brought to the position for slicing and dispensing the butter pats. In this connection the butter is preferably put up in elongated, preferably rectangular blocks, although this is more or less immaterial so long as the blocks are of sufficient length to economically feed such blocks through the slicing part of the machine.

Another object of my invention in a butter slicing machine, is to slice the butter by wires which are moved transversely of the block of butter and which wires meet in the interior of the butter, making a complete severance without any breaking of the butter at the severed portion. Another detail feature in this connection is slicing the butter through a considerable part of its cross section and with one wire end, then slicing with the other wire from the opposite side until such two wires meet and completely sever a section or pat of the butter.

Another detailed object and feature of my invention is the manner in which the butter is fed in a forward direction, this being by a feeding arrangement which is operated in conjunction with placing a butter chip or plate underneath the discharge opening of the machine and in which in so placing the plate it is necessary to move a shelf-like structure or the like and thus operate a train of gears and a moving chain or the like, which chain shifts the block of butter towards the cutting wires in successive steps.

Another feature of my invention is an adjustable device by which the thickness of butter served in each pat may be varied. Another detail feature of my invention is employing a gate which forms a closure over the block of butter and is opened to allow discharge of the slices after severing from the block of butter.

My invention is illustrated in connection with the accompanying drawings, in which Fig. 1 is a perspective view of my machine showing the exterior;

Fig. 2 is an enlarged longitudinal section taken on the line 2—2 of Fig. 3, substantially through the center of the machine;

Fig. 3 is a vertical transverse section substantially on the line 3—3 of Fig. 2 in the direction of the arrows;

Fig. 6 is an enlarged longitudinal section showing a train of gears to operate the feed device for the block of butter;

Fig. 7 is a detail part section and part elevation showing the manner of controlling the door or gate forming a cover for the butter in its closed position;

Fig. 8 is a view similar to Fig. 7 with the gate in its open position;

Figure 1:
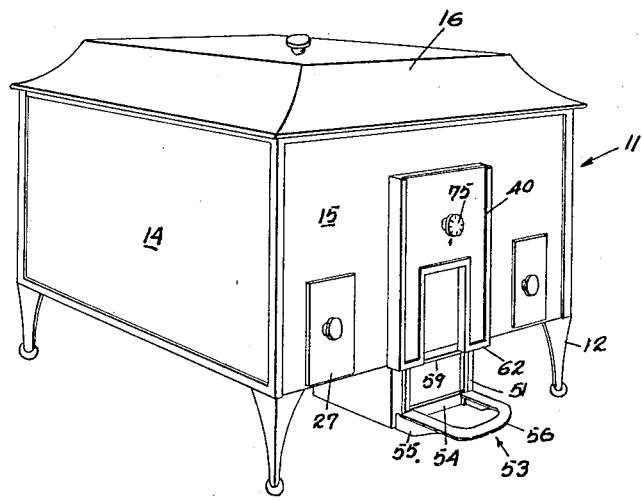

In the drawings, a box-like structure 11 is illustrated as being mounted on legs 12. This structure has a bottom wall or floor 13, opposite side walls 14, a front wall 15 and a removable cover 16, which cover is preferably insulated for preservation of the ice. Inside of the box there is a fixed drum 17 which has a longitudinal slot 18 at the bottom in alignment with an elongated slot 19 in the floor of the box. At the top of the drum there is a slidable gate 20 or other closure, this being illustrated as being made of curved plate 21, the edges of which slide in guideways 22 and such plate engages a stop 23 and thus may be utilized to form a closure for the opening. It is through this opening that the butter is fed to the movable part of the machine.

At each side of the drum at the upper part there is an ice compartment 24 and if desired refrigerating coils may be placed in the box instead of the ice compartments. Inside the box there are two elongated housing members 25 forming the storage compartments 26. In these storage compartments there is a movable drawer 27 in which butter may be placed. This drawer is illustrated as being channel-shaped in cross section as indicated at 28 in Fig. 3. The end of the drawer forms a closure for the compartment 26. A considerable amount of butter may be stored in these compartments and is kept cold by the refrigeration means. In the rear part of the box there is a vertical shaft 29 in which there is a sprocket chain 30 which takes over a sprocket wheel 31. The sprocket chain has a weight 32 hinged thereto and this weight is adapted to shift the sprocket chain when released as hereunder detailed. The chain passes over idler sprockets 33 at the bottom of the shaft and extends forwardly to the sprocket 34 which is the driven sprocket and mounted on the sprocket shaft 35, the manner of drive being herein detailed.

The horizontal run 36 of the sprocket and the bottom side thereof leads back to another idler sprocket 37 which is located in a shiftable sprocket cage 38, this cage being adjustable by a nut and screw arrangement 39. (Note Fig. 2.) By this means the proper tension may be kept on the chain. On the front of the machine there is a rectangular frame 40 which houses the mechanism for slicing the butter, there being an opening 41 for dispensing of the slices. A guide plate 42 is mounted on the front of the box and this is illustrated as having a web portion 43 and marginal flanges 44. A carrier 45 is slidably mounted bearing on its back against the front of the box and against the web 43. This carrier has racks 46 on opposite sides, which racks engage with pinions 47 which are mounted on fixed studs 48 on the cabinet. These studs are rotated by moving racks 49 which slide in guideways 50 built on in front of the cabinet and inside of the frame 40.

Figures 4, 5:
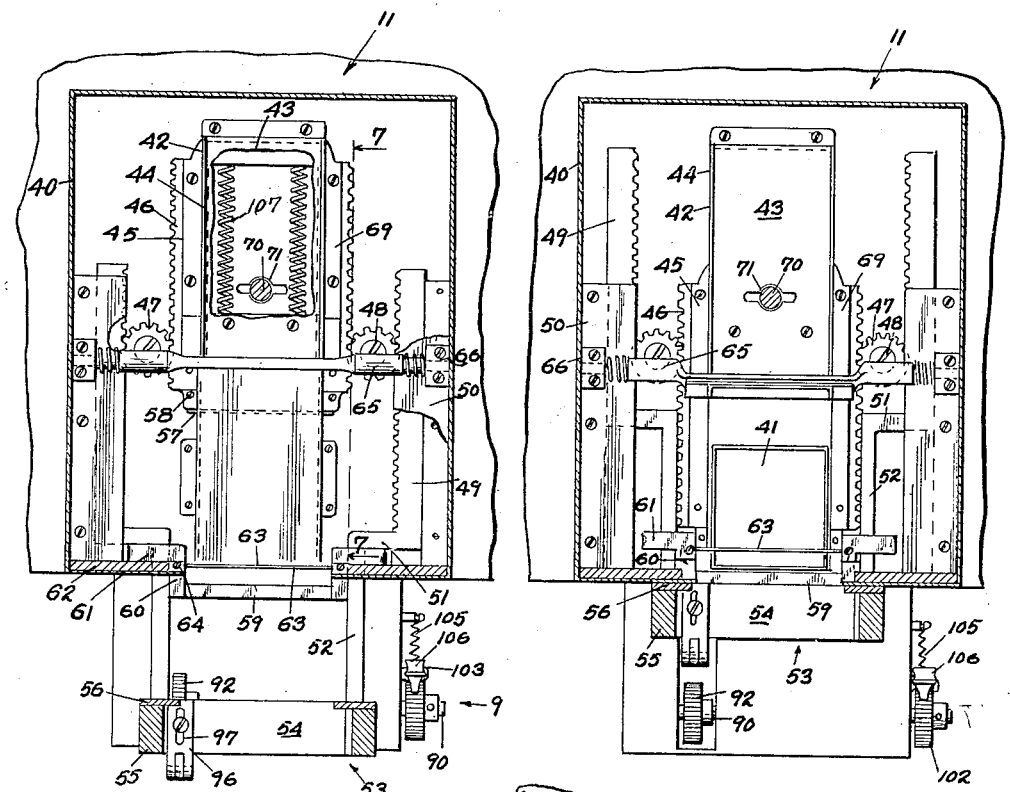
Fig. 4 is a vertical section substantially on the line 4—4 of Fig. 2 in the direction of the arrows, illustrating the parts in position prior to the slicing of the butter.
Fig. 5 is a view similar to Fig. 4, showing the parts in position after completion of the slicing.
Figure 9:
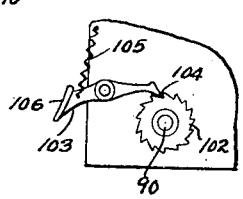
Fig. 9 is a detail taken in the direction of the arrow 9 of Fig. 4, showing the restraining ratchet wheel and pawl.

The legs 49 have an inwardly turned bar 51 on the bottom at each side and depending from the bar 51 there are a pair of vertical rods 52. These rods support and open bracket 53, the bracket having a back strip 54, two side portions 55 and an encircling strap 56 (note particularly Figs. 1, 2 and 4). The butter chip or plate is intended to be placed underneath the bracket 53 and pressed upwardly lifting the bracket, hence thrusting the racks 49 upwardly, rotating the pinions 47 mounted on the studs 48 and which latter gear with the racks 46 thrust down on the carrier 45, which carrier is somewhat in the form of a plate.

The mechanism for slicing the butter comprises a wire 57 which is secured to the carrier at opposite sides by means of the screws 58. This wire fits on the outside of the lower portion of the web 43 of the guide structure 42 and when the carrier is moved downwardly, this wire is forced down and across the opening 41, but not completely to the bottom of such opening. In the lower part of the machine there is a cross strip 59 which strip has side pieces 60 extending thereabove and guide plates 61 which are adapted in the lowered position to rest on the bottom bar 62 of the frame 40 on the front of the box. These plates 61 have an opening therethrough for the vertical rods 52 so that such rods may freely slide through the plates 61. The lower wire 63 is attached by screws 64 to opposite sides of the side pieces 60 and is set forwardly of the bar 59 so that this wire may pass upwardly on the outside of the opening 41 for discharge of the butter.

The butter is fed forward in the manner hereinunder detailed and when the bracket 53 is raised it first forces the upper wire downwardly through the butter, this being lowered by the carrier and when the back strip 54 engages the bar 59, it elevates this bar, thus carrying the wire 63 which cuts into the butter from the bottom. The upper wire continues its downward movement and the lower wire moves until the wires meet substantially in the position shown in Fig. 5. This completely severs the slice or pat of butter and allows it to fall.

In order to protect the butter and keep it clean, there is a movable gate 64. This gate is preferably made of sheet metal and is rotatably mounted on a hinged pintle 65 which is journaled in journal blocks 66 on opposite sides of the frame 40. This pintle has projecting nubs 67 which engage a cam surface 68 formed on the rack bars 46 and thus when the carrier with the upper wire is lowered and the racks 46 move downwardly, the cams 68 on each side of the carrier engage the nubs 67 and swing the gate in the opened position shown dotted in Fig. 2 and full in Fig. 8. The flat parts 69 of the cam plates hold the gate open during the continued downward movement of the carrier with the upper wire.

The loading arrangement for the butter is as follows, having reference particularly to Figs. 2 and 3: A rotatable shaft 70 is journaled in the front wall of the machine as indicated at 71 and in a journal 72 formed in the back wall 73 of the drum 17. This shaft extends outwardly, passing through the cover plate 74 mounted in the frame 40 and has an operating handle 75 on the front. This handle has a series of indicating marks 76 to show when the butter compartments are in proper position as hereinunder detailed and in addition on the rear end of the shaft there is a small disk 77 which has notches 78 therein and into these notches there is pressed a ball 79 by a spring pressure device; this also indicating and locating the butter compartments in the proper position for the slicing operation.

Fixedly connected to the shaft 70 I illustrate a sleeve-like construction 80 which has head structures 81 at opposite ends and built between the head ends 81 there are a series of compartments 82. These compartments each have an inner wall 83 and two side walls 84 extending longitudinally of the shaft and the drum, but are open at the side next the drum as indicated at 85. It is through these openings that the butter is charged into the compartments after opening the charging door construction 20 in the top of the drum. The drum may be rotated in either direction by preferably a clockwise direction, which carries the butter in the form of a rectangular block from the charging opening 20 of the drum to the bottom. The slidable nub 79 stops the rotatable cage having the butter compartments over the opening 18 in the drum and the opening 19 in the bottom of the box.

The longitudinal feed of the butter is as follows, having reference particularly to Figs. 2, 4, 5 and 6: On one end of the shaft 35 which has the sprocket wheel 34 with the sprocket chain taking thereover at the forward end of the machine, there is a gear 86. A train having two gears 87 mounted on studs 88 are located in a gear box 89 depending from the bottom of the box 11 underneath the front and immediately behind the bracket 53. A ratchet shaft 90 extends across this gear box and is journaled in opposite sides thereof and has a gear 91 meshing with the lower gear 87. A ratchet wheel 92 is secured to the shaft and is engaged by a dog or pawl 93 which is pressed towards the ratchet wheel by a spring 94. This pawl is mounted on a pivot 95, which pivot is attached to an adjustable plate 96. This plate has a slot 97 and is attached by a screw to the bar 54 of the carrier 53. The pawl may thus be adjusted in the vertical position and is carried upwardly on the upward movement of the bracket 53, thus giving a motion to the train of gears and hence operates the sprocket chain.

The adjustment in the plate 96 allows the variation of the feed and of the movement of the sprocket chain. On the sprocket chain there is a pusher plate 98 which has one end 99 connected to the chain and an upwardly extending end 100 to engage the back of a rectangular block of butter, the butter being indicated at 101. (Note Fig. 2.) On the opposite end of the ratchet shaft 90 there is a second ratchet wheel 102. This is engaged by a pawl 103, which pawl has a tooth 104 engaging the ratchet wheel 102 and drawn thereagainst by a spring 105 which is secured on the outside of the gear box 89. A finger pressure end 106 on the dog allows the releasing of this. The purpose of the pawl 103 in cooperation with the ratchet wheel 102 is to hold the train of gears 96 and 97 stationary after it has been shifted by the upward movement of the pawl 93 and thus hold the sprocket chain with the pusher advanced.

It will be seen that on each upward movement of the bracket 53 for dispensing the butter, that the ratchet wheel 92 is first moved, this then causes first a forward feed of the block of butter and after the feeding stops, the upper cutting wire begins the slicing operation followed by the movement of the lower cutting wire. On the downward movement of the bracket 53 the ratchet wheel 92 is not influenced and the train of gears remain stationary, being held by the pawl and ratchet 103 and 102. However, after a block of butter has been completely sliced, the finger pressure surface 106 of the pawl 103 may be pressed and disengage this pawl, whereby the counterweight 32 operates the chain in a reverse direction and retracts the pusher 98.

In order to counter balance the bracket 53, a spring 107 is utilized to draw upwardly on the carrier and is mounted behind the guide structure 42. The flanges 44 of this guide 42 are utilized to engage the margins of the structure having the cams 68 and 69, thus holding the racks and the cams properly centered in regard to the machine.

The whole box is closed in, there being a trough-like construction 108 extending from the back of the machine below the opening 19 and housing the lower horizontal run of the sprocket chain. The gear box 89 is also housed in so that the whole interior of the box may be kept at a low temperature by the ice or refrigerating medium therein. It is also understood that the box construction will be made in such manner as to form a good heat insulator.

Various changes may be made in the principles of my invention without departing from the spirit thereof as set forth in the description, drawings and claims.

I claim:

1. A butter slicing machine, comprising in combination means to support and to shift a block of butter longitudinally step by step, slicing devices, each comprising a frame with a wire stretched therein, said wires being positioned when the machine is inoperative one on one side and the other on the other side of the block, means to first move one of the frames and its wire transversely of the block until such block is partly severed and then means to move the other frame and its wire transversely of the block from the opposite side, said wires being adapted to meet in the body of the butter and thereby sever slices therefrom.

2. A butter slicing machine, comprising in combination means to support and to feed a block of butter in a longitudinal direction in a step by step manner, a pair of slidable frames positioned at one end of the machine, each having a slicing wire therein, a movable bracket adapted to be shifted by engaging with a butter plate, means connected to said bracket to shift the upper frame downwardly and move the upper wire transversely across the block of butter, and in a further operation shift the lower frame with its wire upwardly, the said wires being adapted to meet in the body of the butter and thus sever a slice therefrom.

3. A butter slicing machine, comprising in combination a structure having a receptacle for a block of butter, there being an opening at the end of the receptacle, means to feed the block of butter in a step by step manner towards the said opening, a vertically movable bracket adapted to be engaged by a butter plate and on the upward movement of the plate the said bracket being moved upwardly, an upper slidable frame having a wire therein, a lower slidable frame having a wire therein, a geared connection between the bracket and the upper frame to move said frame downwardly on the upward movement of the bracket, means connected with the bracket adapted to engage the lower frame and to move the lower frame and its wire upwardly, the said wires being adapted to cut into the block on opposite sides and to meet in the interior of the block, thereby severing a slice therefrom.

4. A butter slicing machine, comprising in combination a structure having a receptacle for a block of butter with an opening at one end, a slidably mounted bracket adapted for vertical movement, an upper frame having a slicing wire, a lower frame having a slicing wire, an interconnection between the bracket and the upper frame to move said upper frame and its wire downwardly on the upward movement of the bracket, means connected with the bracket to engage the lower frame and to move such frame and its wire upwardly, said upward movement commencing subsequent to the movement of the upper wire, whereby the upper wire cuts mainly through the block before the lower wire, the said wires being adapted to meet in the body of the butter and sever a slice therefrom.

5. A butter slicing machine as claimed in claim 4, means to feed the butter step by step and a connection between the bracket and the feeding means to feed the butter between the severing operations on movement of the bracket.

6. A butter slicing machine, comprising in combination a structure having a receptacle for a block of butter, there being an opening at one end, a slidable upper frame having a wire normally positioned above the said opening, a lower slidable frame having a second wire normally positioned below said opening, a vertically slidable bracket positioned below the said opening, the upper frame having a rack connected thereto, the bracket having a rack and a geared connection between said racks, whereby the upward movement of the bracket causes the downward movement of the said upper frame, means forming a direct connection between the bracket and the lower frame, whereby on elevation of the bracket the lower frame is elevated, the said wires being adapted to cut into the butter from opposite sides and to meet in the interior thereof and sever a slice from the block.

7. A butter slicing machine, comprising in combination a receptacle for a block of butter, there being an opening in the machine at one end of the receptacle with a gate forming a closure for said opening, a butter feeding device positioned adjacent the said receptacle and having a part movable longitudinally thereof to engage a block of butter, a butter severing device comprising an upper and lower frame, each having a cutting wire, a vertically movable bracket, said bracket on its upward movement operating the said device and shifting the butter forward a predetermined distance, means operated by the bracket to force the upper frame downwardly and the upper wire into the block of butter, and force the lower frame upwardly with its wire into the block of butter, the said wires meeting in the block and severing a slice therefrom, and means operating in a movement of the bracket to open the said door to allow discharge of a severed slice.

8. A butter slicing machine comprising in combination means to support and shift a block of butter longitudinally step by step, a slicing device having a first and a second wire, means to move the first wire transversely of the block until such block is partly severed, and means to then move the second wire transversely of the block at the opposite side, said wires being adapted to meet in the body of the butter and thereby sever slices therefrom.

9. A butter slicing machine comprising in combination means to support and shift a block of butter longitudinally step by step, a pair of slicing devices each comprising a frame with a wire stretched thereon, said wires being horizontal, means to position said wires apart to allow feeding of the block of butter, means to first move one of the frames and its wire transversely of the block until such block is partly severed, and means to then move the other frame and its wire transversely of the block on the opposite side, said wires being adapted to meet in the body of the butter and thereby sever slices therefrom.

10. A butter slicing machine comprising in combination means to support and feed a block of butter in a longitudinal direction in a step by step manner, a movable bracket adapted to be shifted by engaging with a butter plate, a slicing means for the butter, and means actuated by the movement of the bracket due to the upwardly lifting of the butter plate to actuate the said slicing means.

11. A butter slicing machine comprising in combination means to support and feed a block of butter in a longitudinal direction in a step by step manner, a structure having an opening through which the end of the block of butter is fed, a vertically movable bracket positioned below said opening and adapted to be moved upwardly by the upward lifting of the butter plate, a butter slicing means, and an interconnection between the bracket and the slicing means to operate said slicing means on the upward movement of said bracket.

12. A butter slicing machine as claimed in claim 11, a drive means for the step by step feed of the butter, and means to intermittently actuate said drive means on the movement of the bracket.

13. A butter slicing machine comprising in combination means to support and feed a block of butter in a longitudinal direction in a step by step manner, a vertically slidable bracket having an opening and shaped to receive a butter plate underneath the said bracket, the said bracket being adapted for upward movement on lifting of the butter plate, butter slicing means, and an interconnection between the bracket and the butter slicing means to operate the slicing means on the upward movement of the bracket.

14. A butter slicing machine comprising in combination a receptacle for a block of butter, there being an opening in the machine at one end of the receptacle with a door forming a closure for said opening, a butter feeding device positioned adjacent said receptacle to feed a block of butter in a step by step manner, a butter severing device, a vertically movable bracket positioned outside of said opening, and means operated by the upward movement of the bracket to intermittently operate the feeding device, the butter severing device, and to open the said door.

15. A butter slicing machine comprising in combination a receptacle for a block of butter, there being an opening in the machine at one end of the receptacle with a door forming a closure for such opening, a butter severing device having a pair of movable wires positioned at opposite sides of the opening, a butter feeding device having an intermittent movement to advance a block of butter step by step, a vertically movable bracket outside of the opening, said bracket having an opening and being adapted to be engaged by a butter plate and to be lifted upwardly by the lifting of such plate, means interconnecting the bracket and the feeding device, the severing device, and the door, to operate said devices and the door on the movement of the bracket.

16. In a butter slicing means having a receptacle for a block of butter, a feeding means comprising an endless chain having an upper horizontal run with means to engage a block of butter, a lower horizontal return run, a pair of vertical runs extending upwardly behind the end of the block of butter, a severing device, a vertically movable bracket having means to engage a butter plate and said bracket being movable by movement of such plate, an interconnection between the bracket and the endless chain to intermittently shift the endless chain in one direction on the movement of the bracket, an interconnection between the bracket and the severing means to operate said latter means on the movement of the bracket, counterweight means attached to one of the vertical runs of the chain to return the endless chain to its original position.

In testimony whereof I have signed my name to this specification.

U. A. MICHELI.